(12) United States Patent
Simm et al.

(10) Patent No.: US 7,425,109 B2
(45) Date of Patent: Sep. 16, 2008

(54) SUCTIONING DEVICE FOR A MACHINE TOOL

(75) Inventors: Robert Simm, Oekingen (CH); Jan Peter Houben, Poppel (BE); Ruben Jan Moerbeek, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 10/528,986

(22) PCT Filed: Sep. 3, 2004

(86) PCT No.: PCT/DE2004/001958

§ 371 (c)(1),
(2), (4) Date: Mar. 24, 2005

(87) PCT Pub. No.: WO2005/039832

PCT Pub. Date: May 6, 2005

(65) Prior Publication Data

US 2006/0153650 A1 Jul. 13, 2006

(30) Foreign Application Priority Data

Oct. 6, 2003 (DE) ................ 103 46 207

(51) Int. Cl.
*B23Q 11/00* (2006.01)
*B23B 47/34* (2006.01)

(52) U.S. Cl. .............. 408/67; 173/198; 408/110

(58) Field of Classification Search ......... 408/67, 408/110–112, 712, 58; 409/135–137; 173/198, 173/59, 71, 75, 77; 451/453, 456

See application file for complete search history.

(56) References Cited

U.S. PATENT DOCUMENTS

| 3,850,254 | A | * | 11/1974 | Hirdes ........................ 173/75 |
| 4,184,226 | A | * | 1/1980 | Loevenich ................ 15/415.1 |
| 4,250,971 | A | * | 2/1981 | Reibetanz et al. ............ 173/21 |
| 5,090,499 | A | * | 2/1992 | Cuneo ....................... 175/209 |
| 5,113,951 | A | * | 5/1992 | Houben et al. .............. 173/75 |
| 5,129,467 | A | * | 7/1992 | Watanabe et al. ............ 173/75 |
| 5,199,501 | A | * | 4/1993 | Kluber et al. ................ 173/75 |
| 5,467,835 | A | * | 11/1995 | Obermeier et al. ......... 175/209 |
| 5,915,894 | A | * | 6/1999 | Okada et al. ................ 408/204 |
| 5,993,122 | A | * | 11/1999 | Baker ......................... 408/67 |
| 6,615,930 | B2 | * | 9/2003 | Bongers-Ambrosius et al. ........................ 173/198 |
| 6,848,985 | B2 | * | 2/2005 | Lamprecht et al. ......... 451/453 |
| 6,851,898 | B2 | * | 2/2005 | Ege et al. .................... 408/67 |
| 6,887,146 | B2 | * | 5/2005 | Staas et al. .................. 454/66 |
| 7,017,680 | B2 | * | 3/2006 | Arich et al. ................ 173/198 |
| 7,281,886 | B2 | * | 10/2007 | Stoerig ....................... 408/67 |
| 2002/0122705 | A1 | * | 9/2002 | Wehmeier .................. 408/111 |
| 2002/0141836 | A1 | * | 10/2002 | Ege et al. .................... 408/67 |
| 2002/0154960 | A1 | * | 10/2002 | Lin ............................. 408/67 |

FOREIGN PATENT DOCUMENTS

BE 1009324 2/1997

(Continued)

*Primary Examiner*—Erica Cadugan
(74) *Attorney, Agent, or Firm*—Michael J. Striker

(57) ABSTRACT

A suction device for a power tool, in particular for a drilling and/or chipping tool, has at least one dust container and at least one suction head to be placed on a workpiece, wherein the dust container is integrated in the suction head.

20 Claims, 11 Drawing Sheets

FOREIGN PATENT DOCUMENTS

| | | |
|---|---|---|
| DE | 31 21 496 A1 | 12/1982 |
| DE | 35 01 753 A1 | 7/1986 |
| DE | 4030067 A1 * | 3/1992 |
| DE | 43 42 484 A1 | 4/1995 |
| GB | 2247852 A * | 3/1992 |
| GB | 2 344 648 A | 6/2000 |

* cited by examiner

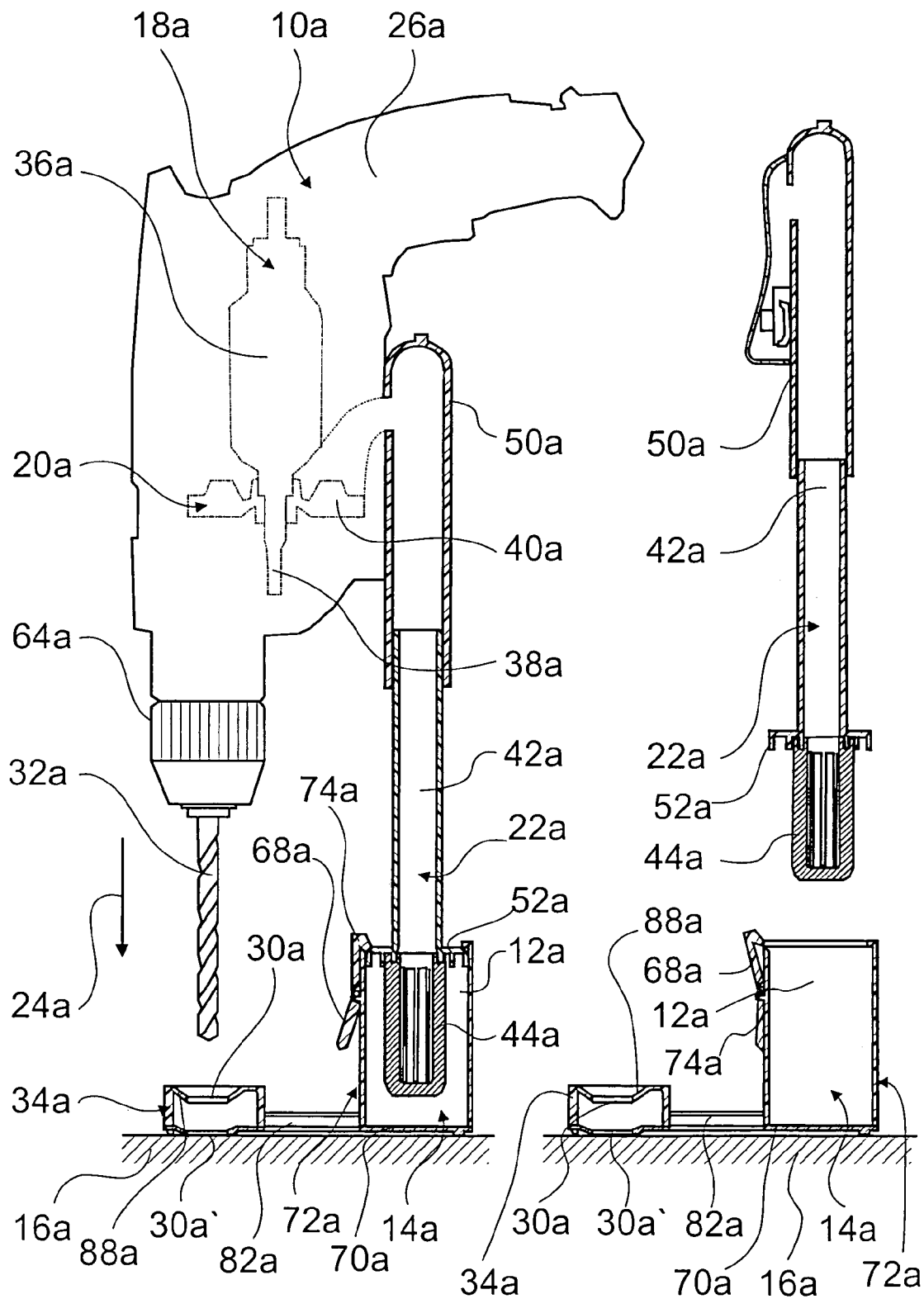

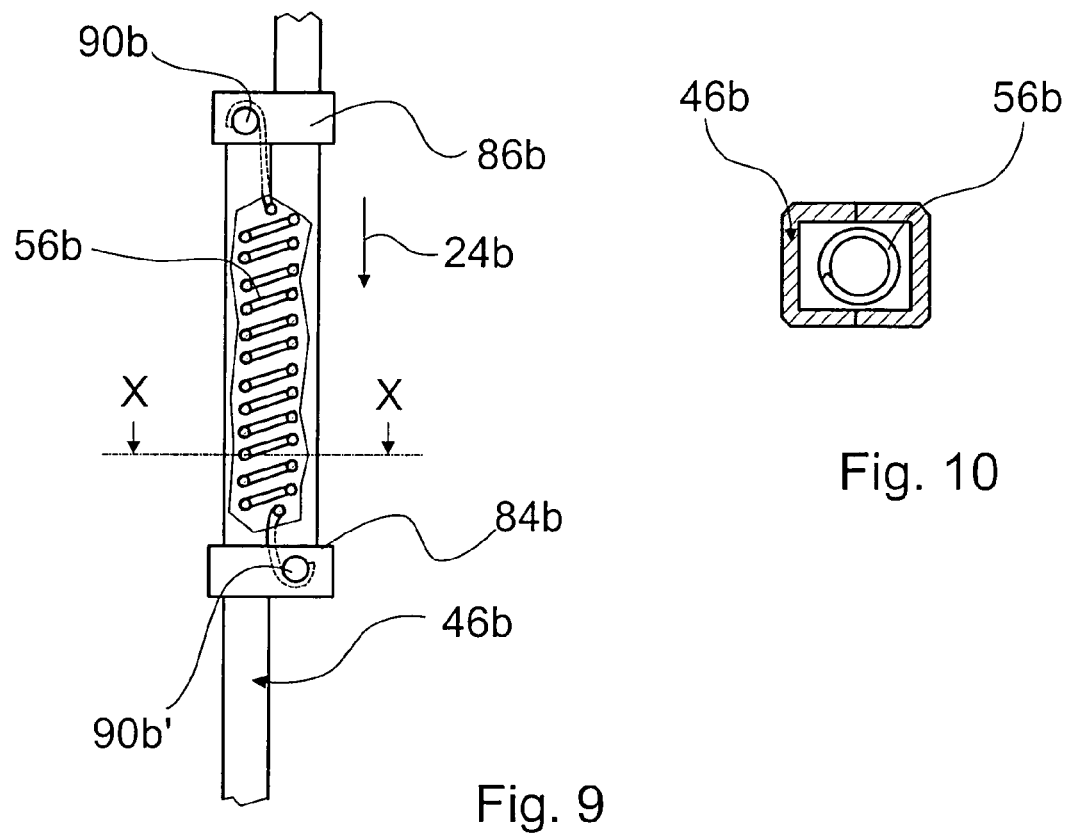
Fig. 9
Fig. 10
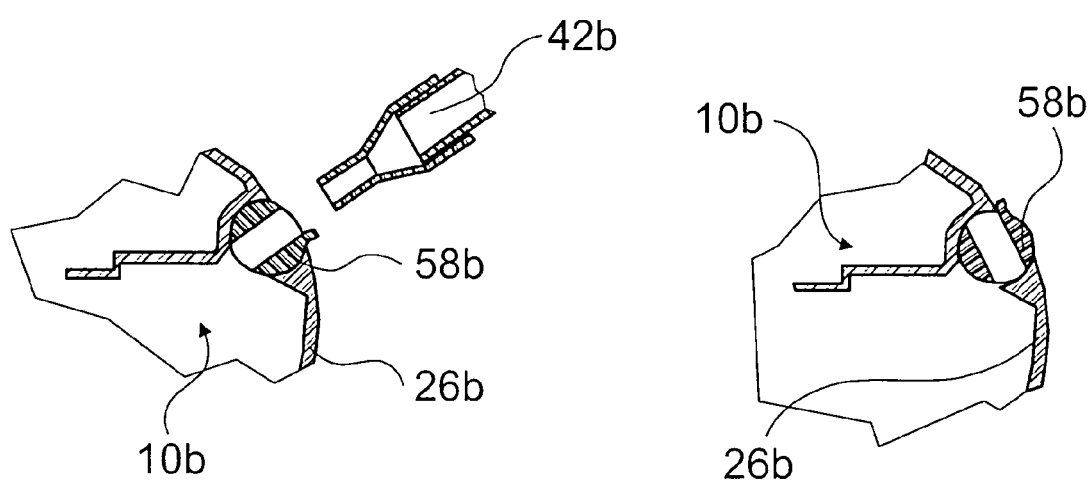
Fig. 11
Fig. 12

SUCTIONING DEVICE FOR A MACHINE TOOL

CROSS-REFERENCE TO A RELATED APPLICATION

The invention described and claimed hereinbelow is also described in German Patent Application DE 103 46 207.4 filed on Oct. 6, 2003. This German Patent Application provides the basis for a claim of priority of invention under 35 U.S.C. 119(a)-(d).

BACKGROUND OF THE INVENTION

The present invention relates to a suction device for a power tool.

SUMMARY OF THE INVENTION

Suction devices for suctioning away material removed during the machining of work pieces, in particular drill dust and drill cuttings that accumulate when working with a drilling and/or chipping tool, are widespread. The removed material should be suctioned away and captured as close as possible to the site of origin to prevent it from spreading in the surroundings, in particular in living spaces.

A suction device for a drilling and/or chipping tool with a dust container and a suction head to be placed on a work piece that forms the general class is made known in US 005 113 951 A.

ADVANTAGES OF THE INVENTION

The present invention is based on a suction device for a power tool, in particular for a drilling and/or chipping tool, with at least one dust container and at least one suction head to be placed on a work piece.

It is proposed that the dust container be integrated in the suction head. This allows the removed, suctioned-away material to be captured as soon as it is produced and prevents the removed material from contaminating a large partial section of the suction device, in particular a suction fan.

The dust container is considered to be integrated in the suction head in particular when a suction part of the suction head forms a single one-piece unit with the dust container that is noticeably continuous in three dimensions and, particularly advantageously, is rigidly connected therewith. Embodiments of the present invention are feasible, however, in which the dust container is located in a front region of a suction duct that connects the suction part with the suction fan, and a section of the suction duct that is smaller than a total length of the suction duct is located between the suction part and the dust container. Particularly advantageously, a suction device according to the present invention is usable with drilling and/or chipping tools. It is also feasible for it to be used for milling, scraping or other power tools with which removed material is produced in a narrowly constricted area.

In a further embodiment of the present invention, this suction device includes a suction unit integrated in the power tool for producing a vacuum in the suction head. As a result, as compared to a power tool with a suction device configured as an external assembly, greater operator comfort can be achieved and a trailing connecting tube between the suction unit and the power tool can be avoided.

In addition, function integration and an economical, handy and lightweight power tool can be advantageously obtained when the suction device includes a cooling fan of the power tool. The cooling fan can then advantageously perform the function of motor cooling and the function of the suction unit to produce a vacuum. Embodiments with a separate cooling and suction air flow, and a continuous air flow that performs both functions, are also feasible. Separate cooling and suction air flows can be achieved using separate fans—which may be located on a common drive shaft—which are provided as separate fan wheels or which can be integrated in one common fan wheel, or by a realization, for example, in which the suction air flow performs a cooling function after it passes the cooling fan.

If the suction device includes a unit that includes at least the suction head and is detachably retainable on the power tool, the unit can be easily removed to be cleaned or in particularly narrow spaces.

In a further embodiment of the present invention, it is proposed that a unit that includes the dust container be detachably retained on the power tool. This advantageously allows the dust container to be emptied in a comfortable manner.

Embodiments of the present invention in which the detachable unit is retainable using a snap-in connection are particularly advantageous, by way of which attachment and release of the unit are enabled in a particularly rapid and comfortable manner. Other attachment methods, in particular tool-free methods, are also feasible, however.

If the suction head is supported on a housing of the power tool by a bearing unit such that it is displaceable along a working direction, relative motion between the suction head and a work piece can be advantageously prevented or at least controlled in a desired manner, while the power tool moves relative to the work piece in the working direction. With drilling and/or chipping tools in particular, the suction head can be retained in a region of the drilling hole on the surface of the work piece, independently of a current depth of a drilling hole. Embodiments of the present invention in which a spring mechanism returns the suction head to a home position after it has been displaced and then relieved of load are particularly advantageous. If the bearing unit includes a depth stop, a separate device for adjusting a depth stop can be advantageously spared.

If the suction head includes at least one opening through which a tool is capable of being guided in at least one operating state, removed material can be suctioned away reliably and essentially completely in the direct vicinity of the site of its origin. If, in addition, various dimensions can be selected for the opening, these dimensions can be matched particularly advantageously to the dimensions of the tool. Continuous selection options for the dimensions of the opening, such as slidable apertures, for example, and discrete selection options, such as replaceable perforated disks, for example, are also feasible.

In a further embodiment of the present invention, it is proposed that the opening form one end of a funnel-shaped receiving area that tapers in the working direction. This provides an operator with an advantageous view of a suction site without decisively impairing the effectiveness of the suction device.

If the suction head also includes a duct section via which an air flow is capable of being introduced into the dust container in the circumferential direction of the dust container, a swirling air flow can be advantageously achieved in the interior of the dust container, and separation of the removed material from the air flow can be supported by the fact that turbulences are prevented, and by a centrifuge effect.

Further advantages result from the following drawing description. Exemplary embodiments of the invention are shown in the drawing. The drawing, description, and claims contain numerous features in combination. One skilled in the art will also advantageously consider them individually and combine them to form further reasonable combinations.

BRIEF DESCRIPTION OF THE DRAWINGS

FIG. 1 shows a suction device and a power tool with a dust container and a suction head, FIG. 2 shows a section of the suction device in FIG. 1 with a unit that has been removed and contains the dust container, FIG. 9 shows a section of a guide rod of the suction device in FIGS. 7 and 8, FIG. 10 shows a section along a line X-X of the guide rod in FIG. 9, FIG. 11 shows an opened, rotatably supported valve and a section of a suction duct of the suction device in FIGS. 7 through 10, FIG. 12 shows the valve in FIG. 11 in a closed configuration.

DESCRIPTION OF THE PREFERRED EMBODIMENTS

Figure 3:
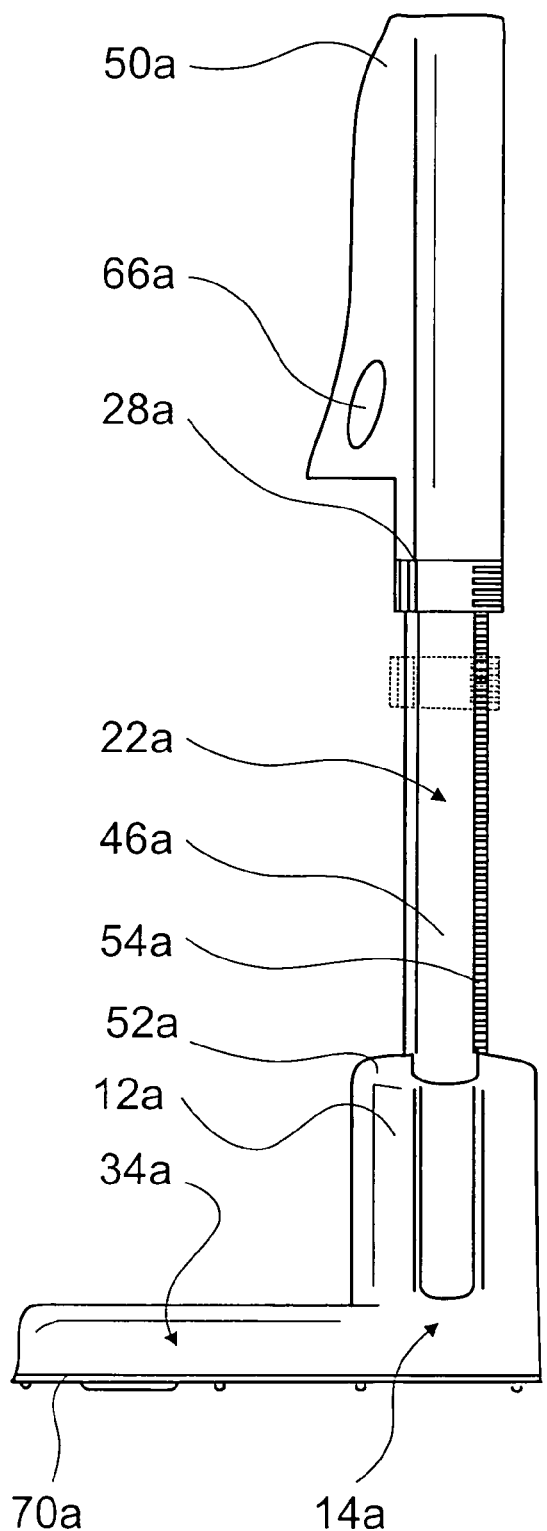
FIG. 3 shows a further removeable unit of the suction device in FIGS. 1 and 2 in a side view.

FIGS. 1 and 2 show a power tool 10a, an impact drill in this case, with a suction device that includes a dust container 12a and a suction head 14a to be placed on a work piece 16a, whereby suction head 14a includes a suction part 34a and dust container 12a, so that the latter is integrated in suction head 14a.

Figure 5:
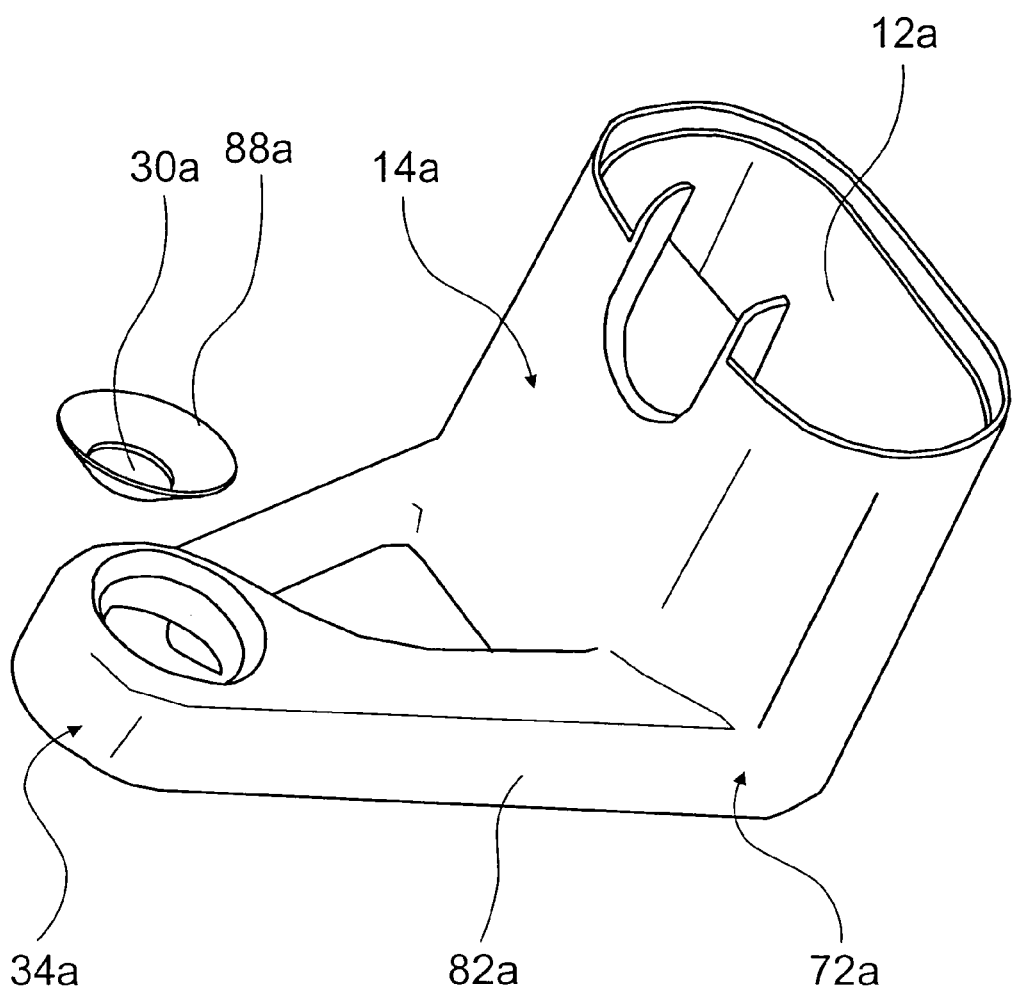
FIG. 5 shows a component of the suction device in FIGS. 1 through 4, and a replaceable cover plate.

In power tool 10a, an integrated suction unit 18a can produce a vacuum in suction head 14a during operation. Suction unit 18a uses a drive motor 36a of power tool 10a, on shaft 38a of which an impeller 40a draws in an air flow from suction head 14a via a suction duct 42a through a filter 44a located in dust container 12a and through dust container 12a and, in its function as cooling fan 20a, directs it further into a housing 26a of power tool 10a. In suction head 14a during operation, air and removed material that is carried along is suctioned up through openings 30a, 30a' in suction part 34a and, via a duct section 82a of suction duct 42a extending perpendicularly to a working direction 24a, is introduced through a duct section 82a of suction duct 42a into said dust container in a circumferential direction of dust container 12a, so that swirling is produced in dust container 12a. Supported by a centrifugal effect, particles of the removed material can separate from the air flow and become deposited on the bottom (FIG. 5). Suction part 34a and dust container 12a are provided with a plexiglass disk 70a on a side facing work piece 16a to enable visual inspection of the amount of removed material that has collected in dust container 12a.

Embodiments of the present invention with transparent partial regions located on sides and/or on a top side of the dust container for visual inspection purposes are feasible.

Figure 4:
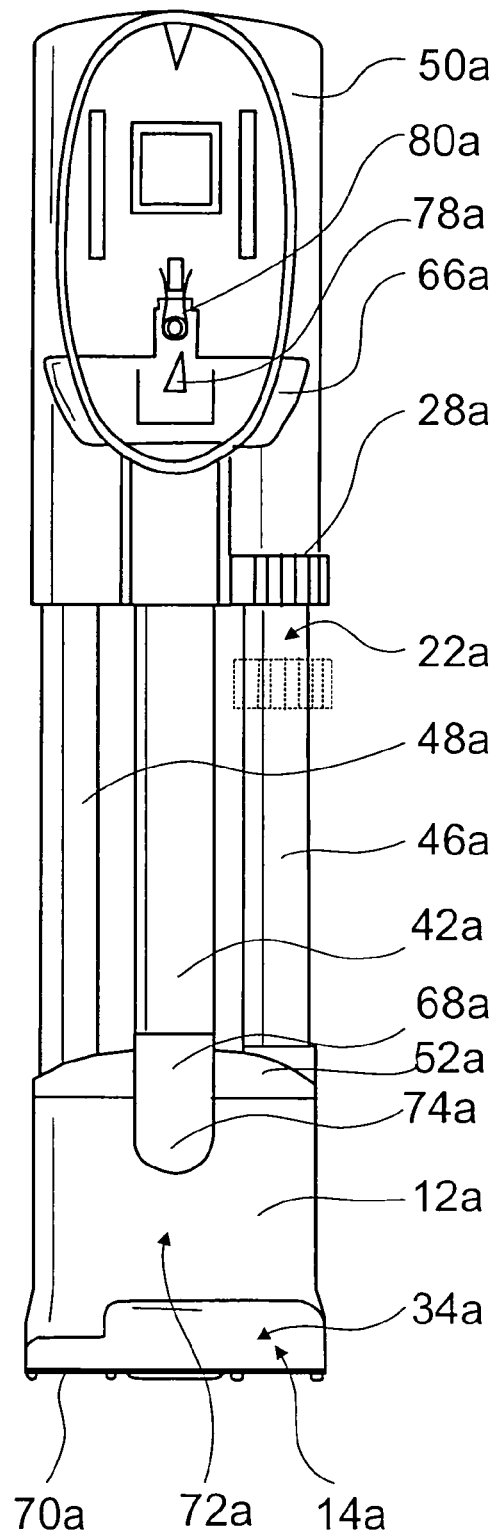
FIG. 4 shows the unit in FIG. 3, in a front view.

Two guide rods 46a, 48a that form a bearing unit extend parallel to suction duct 42a, the guide rods being retained at a first end on dust container 12a and being supported in a second end—as is a front duct piece of suction duct 42a—in tubular recesses in a retention part 50a of suction duct 42a such that they are displaceable in a telescoping manner along their longitudinal extension (FIG. 4). Coil compression springs (not shown) in the interior of guide rods 46a, 48a return the suction device to a starting configuration after it is relieved of load. As a result, suction head 14a is also supported on housing 26a of power tool 10a such that it is displaceable along working direction 24a.

A ring is installed on guide rod 46a that, when rotated, snaps into a toothed profile 54a and can be released therefrom. In the snapped-in state, this ring limits the ability of guide rods 46a, 48a to slide in a direction opposite to working direction 24a, whereby its end face serves as depth stop 28a (FIG. 3, FIG. 4). An embodiment of the present invention that includes a scale for measuring a drilling hole depth on a guide rod is feasible.

Retention part 50a, front duct piece of suction duct 42a, guide rods 46a, 48a and suction head 14a with dust container 12a and suction part 34a form one unit that can be removed from power tool 10a (FIG. 2). It is detachably retained on power tool 10a using a laterally displaceable snap-in connection 66a. Retention part 50a, on its side facing power tool 10a, and power tool 10a, on its side facing retention part 50a, each include guide rails with L-shaped profiles. For mounting, unit 22a is slid against working direction 24a along the guide rails onto power tool 10a, whereby it is guided by the guide rails in the directions perpendicular to working direction 24a. In a setpoint position, a wedge 78a of snap-in connection 66a that is loaded by a two-leg spring 80a and supported such that it is laterally displaceable snaps into place in a corresponding snap-in element of power tool 10a and fixes unit 22a in place. To detach unit 22a, wedge 78a of snap-in connection 66a—which is integrally molded on a slider—can be slid out of its snap-in position.

In addition, a further unit 72a that includes dust container 12a and suction part 34a can be removed from this unit 22a to empty dust container 12a and/or to clean or replace filter 44a. A further snap-in connection 68a including a lever 74a with a hook on one end is used for this purpose; when dust container 12a is in the installed state, the lever holds a cover 52a of dust container 12a tightly against said dust container, the cover being configured as a single component with the front duct part and being joined with filter 44a. When lever 74a of snap-in connection 68a is pivoted, the hook becomes disengaged and unit 72a can be removed (FIG. 2).

Figure 6:
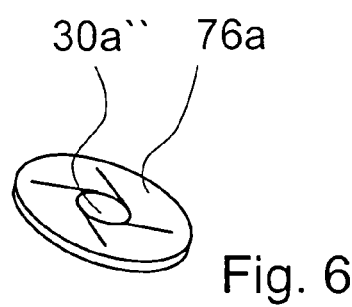
FIG. 6 shows an insert, formed out of rubber, of a suction device in FIGS. 1 through 5.

Suction part 34a is configured substantially in the shape of a can and includes openings 30a, 30a' in a base plate and a cover plate 88a, through which said openings a tool 32a can be guided during operation. Openings 30a, 30a' each form an end of receiving regions of suction part 34a that taper in the shape of a funnel in working direction 24a, thereby advantageously enabling an operator to look through openings 30a, 30a to a region of a drilling hole in work piece 16a. The base plate is formed by plexiglass disk 70a, which can be replaced with alternative plexiglass disks (not shown) that have different dimensions with regard for the funnel-shaped receiving region and/or with regard for opening 30a', thereby enabling the selection of different dimensions for opening 30a'. In addition to the base plate, cover plate 88a is also designed to be replaceable (FIG. 5). Suction part 34a further includes an elastic insert 76a made of rubber with slits extending tangentially to a circumferential direction of an opening 30a'', the insert being insertable, as an option, in place of cover plate 88a and flexibly in a range of drill sizes (FIG. 6).

Alternative exemplary embodiments are shown in FIGS. 7 through 19. In the exemplary embodiments, components that are substantially the same in the description are labelled with the same reference numerals, with letters a-c added to designate the various the exemplary embodiments. Furthermore, the description of the exemplary embodiment in FIGS. 1 through 6 can be referred to with regard for features and functionalities that are the same. The description below is limited substantially to the differences from the exemplary embodiment in FIGS. 1 through 6.

Figure 7:
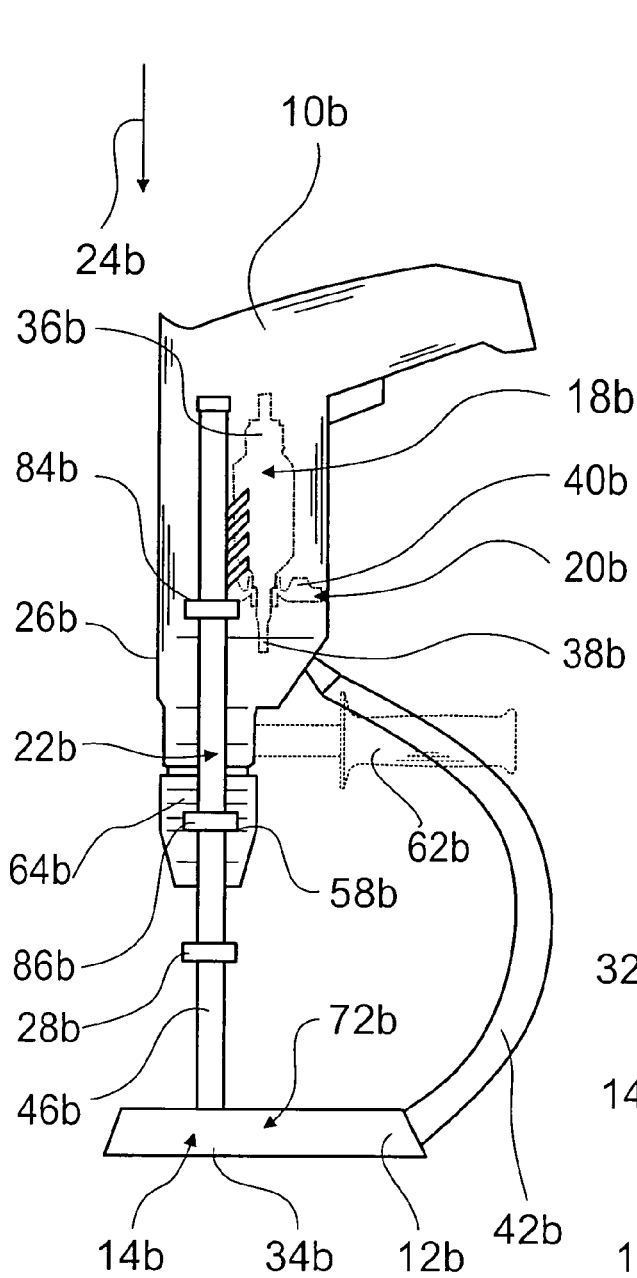
FIG. 7 shows an alternative suction device and a power tool in a side view.
Figure 8:
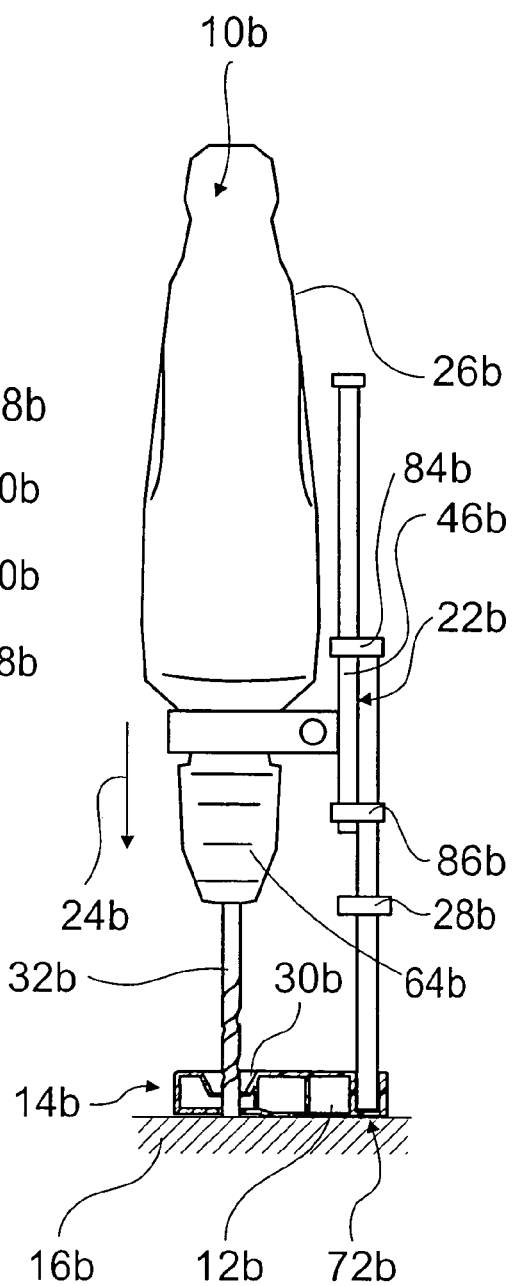
FIG. 8 shows the suction device and the power tool in FIG. 7 in a top view.

FIGS. 7 and 8 show a power tool 10b with an alternative suction device that includes a flexurally soft suction duct 42b configured as a tube. In addition, the suction device includes a bearing unit configured as a guide rod 46b that includes two elements with U-profiles that match up in a region to form a closed profile. A coil tension spring 56b that produces a retractive force is located in the interior space of the region of the closed profile. On the ends of said U-profiles, the elements—which are oriented in opposing directions—of guide rod 46b with guide elements 84b, 86b are connected with each other such that they are displaceable along a working direction 24b, by way of which guide rod 46b may be slid in a telescoping manner. Guide elements 84b, 86b are fastened to the elements of guide rod 46b with screws 90b, 90b', whereby screws 90b, 90b' are used simultaneously as hangers for pulling hooks of coil tension spring 56b (FIG. 9). When the elements of guide rod 46b are telescoped, coil tension spring 56b is extended and produces a retractive force.

Guide rod 46b can be secured to a housing 26b of power tool 10b using a ring above drill chuck 64b at a cylindrical connection point, at which point a handle can also be mounted.

Suction duct 42b can be connected via a valve 58b that is rotatably supported in housing 26b of power tool 10b to a suction unit 18b integrated in power tool 10b to produce a vacuum (FIGS. 11 and 12).

Figure 13:
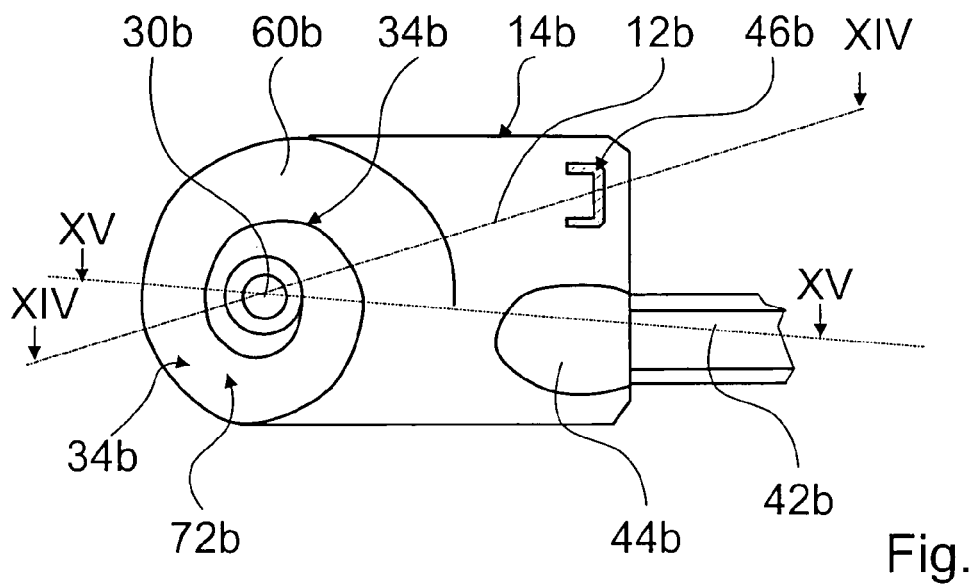
FIG. 13 shows a schematic sketch of a suction head with a suction duct—that widens in the shape of a spiral—of the suction device in FIGS. 7 through 12.
Figure 14:
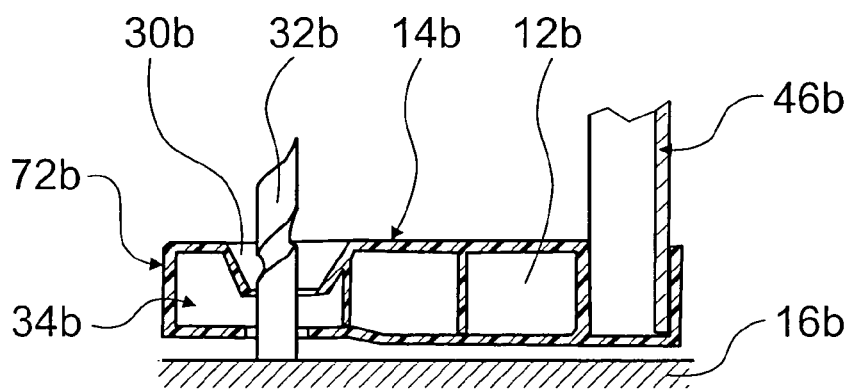
FIG. 14 shows a section along a line XIV-XIV of the suction head in FIG. 13.
Figure 15:
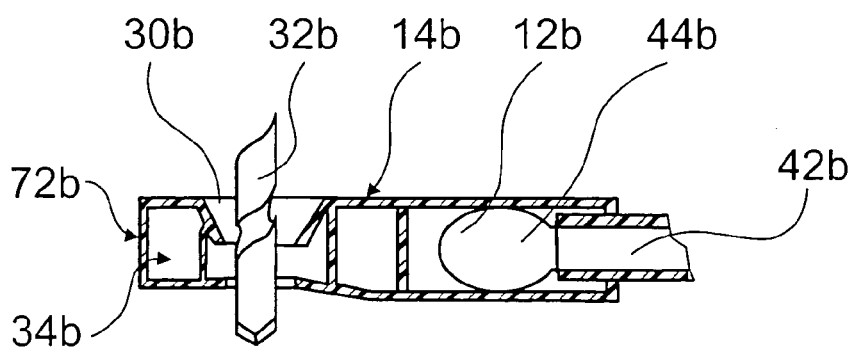
FIG. 15 shows a section along a line XV-XV of the suction head in FIG. 13 with a filter.

To produce an increased suction effect, suction head 14b includes a suction duct 60b that widens in a spiral-shaped manner from an opening 30b outward and empties into a dust container 12b (FIG. 13). In the region of opening 30b, a side of suction head 14b facing work piece 16b includes an opening through which an air flow is suctioned, during high-speed operation, between work piece 16b, in particular a wall, and suction head 14b, by way of which removed material is suctioned away directly at work piece 16b (FIGS. 14 and 15).

Figure 16:
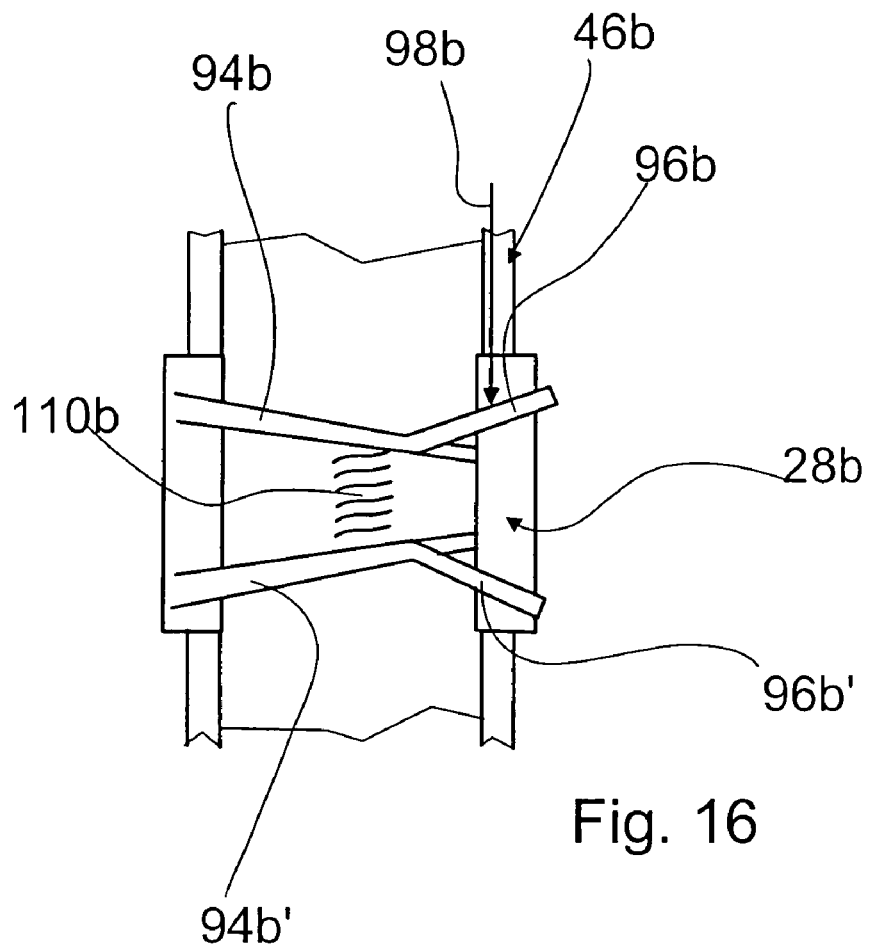
FIG. 16 shows a depth stop of the suction device in FIGS. 7 through 15 in a side view.
Figure 17:
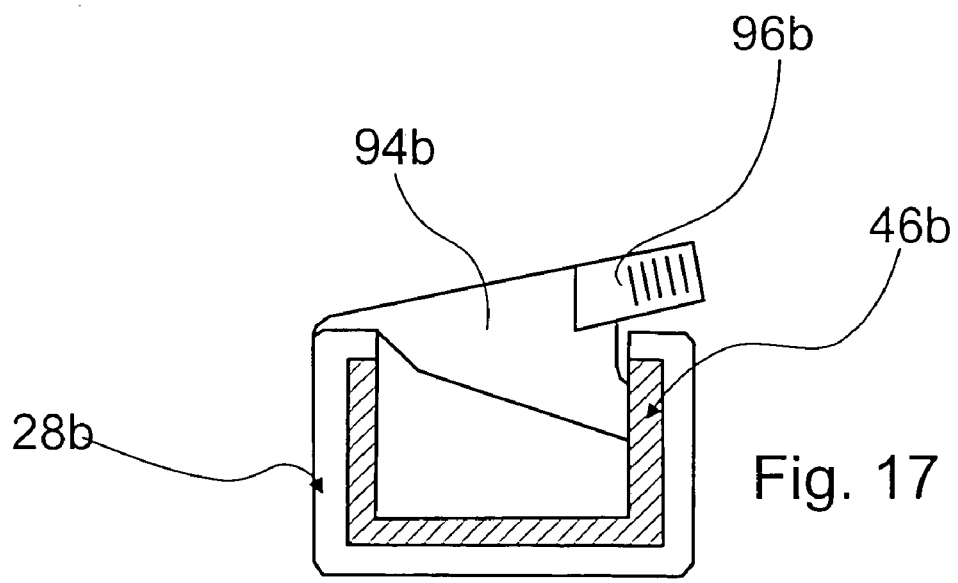
FIG. 17 shows the depth stop in FIG. 16 in a top view.

FIGS. 16 and 17 show a depth stop 28b of suction device, the C-shaped body of which grips a first element of guide rod 46b as a clamp around the U-profile and the top side of which the second element of guide rod 46b can impact. On an open side of depth stop 28b, two legs 94b, 94b' of depth stop 28b engage in the U-profile of the element of guide rod 46b and are retained there by a coil compression spring 110b in opposite directions in tilted positions, by way of which depth stop 28b is prevented from sliding without releasing the tilted position of either of legs 94b, 94b'. The tilted position of legs 94b, 94b' can be released by applying pressure 98b to one of the levers 96b, 96b' installed on legs 94b, 94b', by way of which, via the application of pressure 98b, depth stop 28b may be displaced in the direction of the application of pressure 98b.

Figure 18:
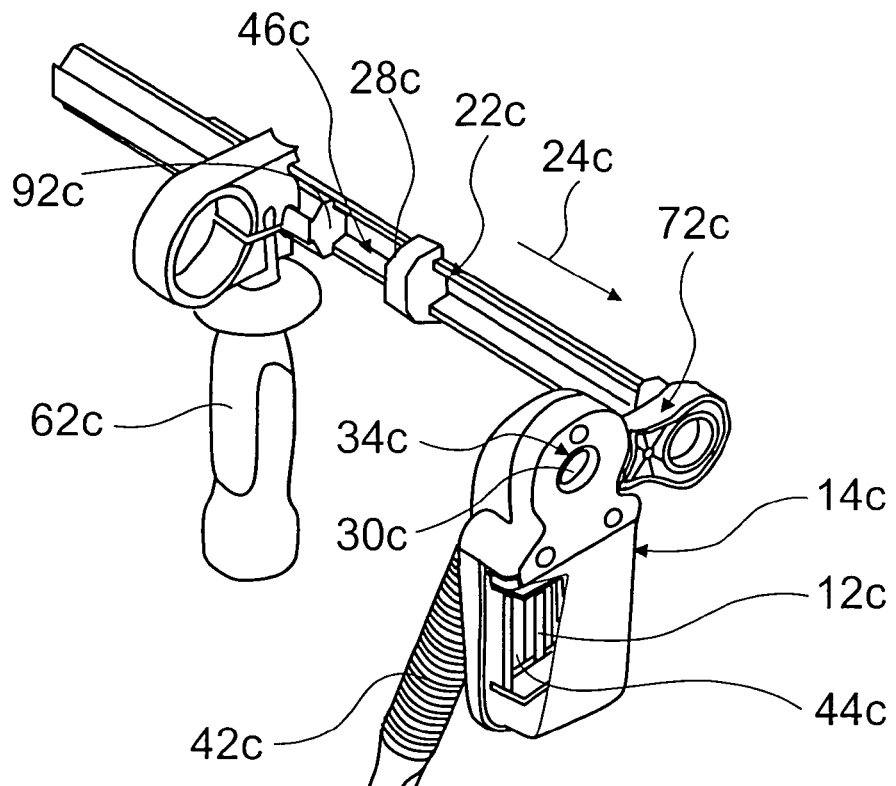
FIG. 18 shows a further alternative suction device with a handle in a view at an angle from the front.
Figure 19:
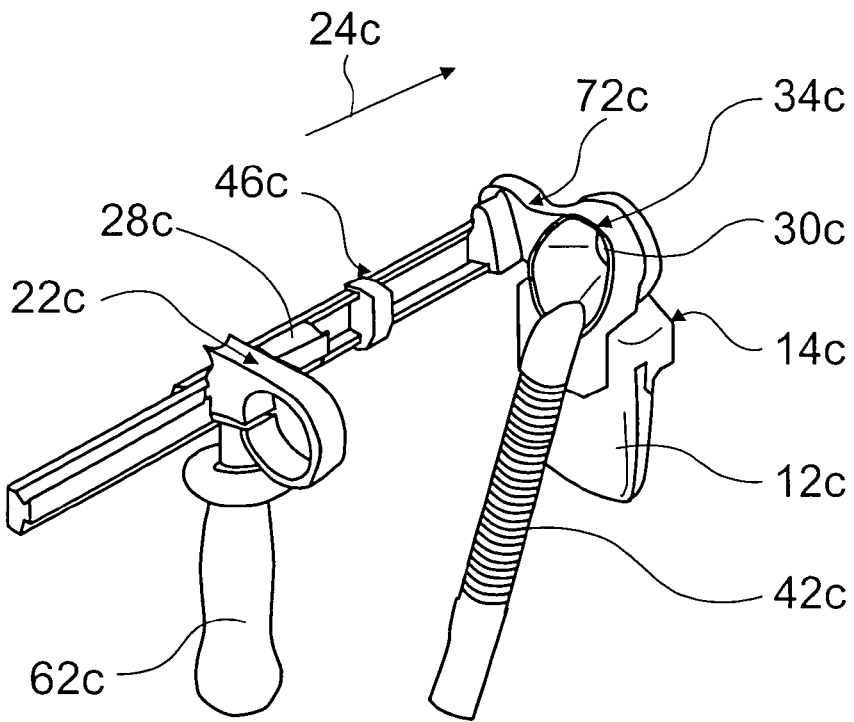
FIG. 19 shows the suction device in FIG. 18 in a view at an angle from the back.
Figure 20:
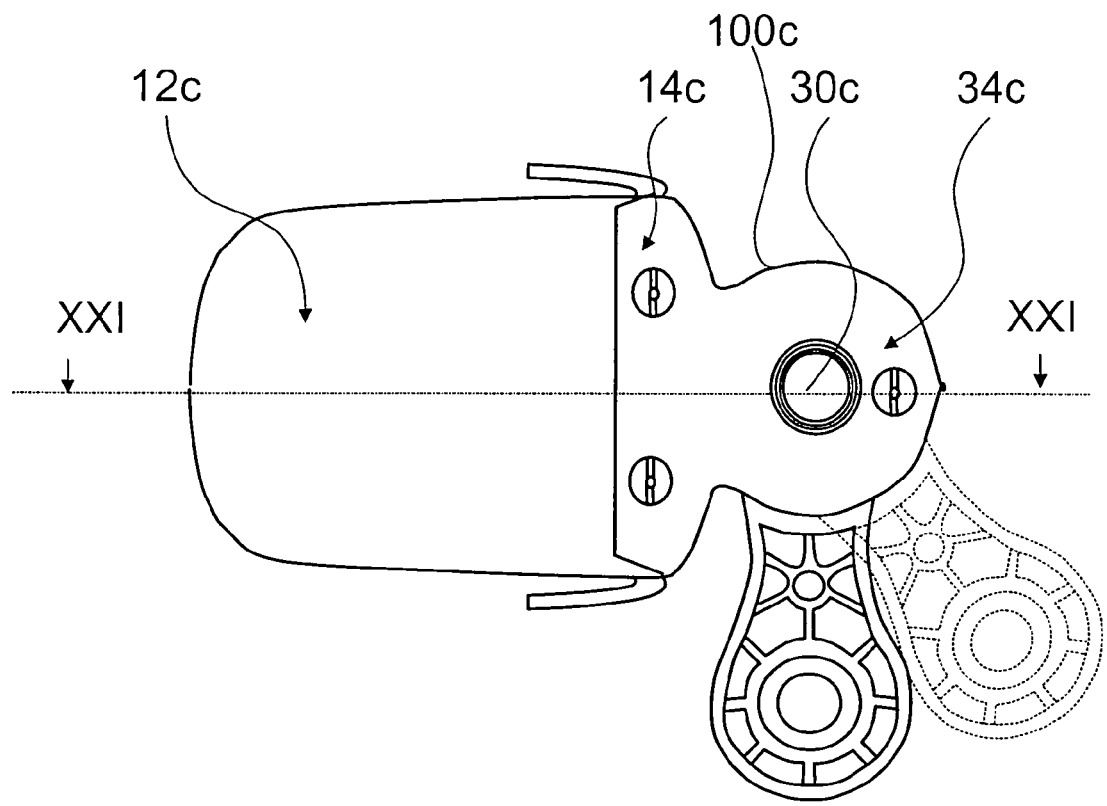
FIG. 20 shows a suction head of the suction device in FIGS. 18 and 19 in a view from below.
Figure 21:
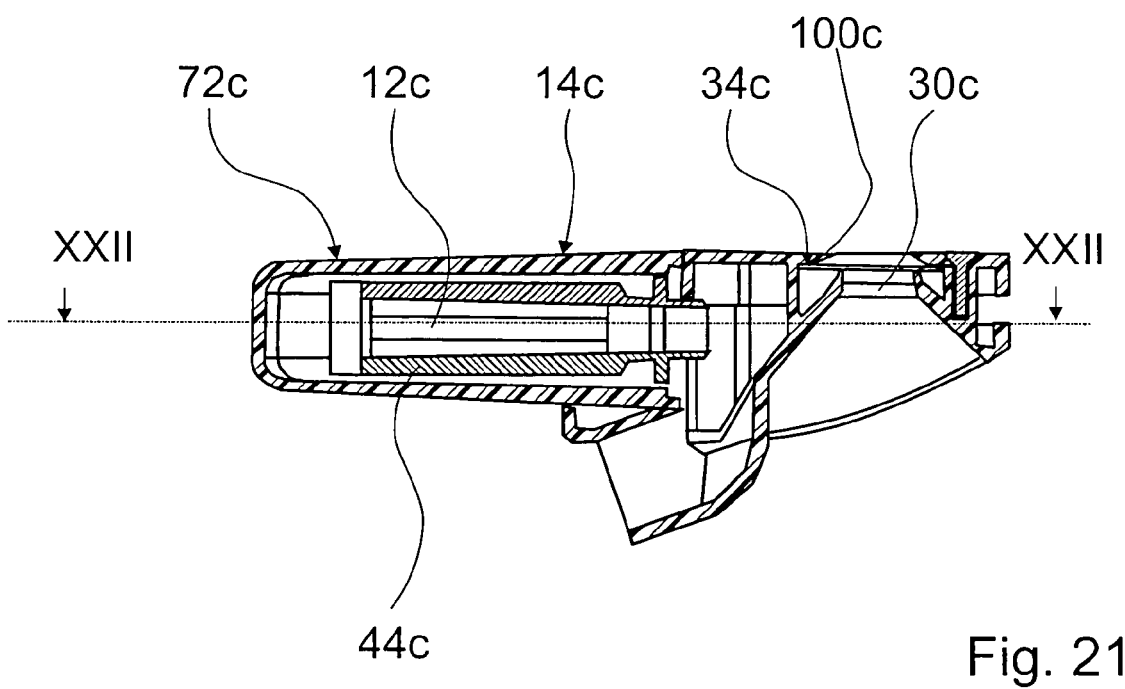
FIG. 21 shows the suction head in FIG. 20 in a sectional view along line XXI-XXI.
Figure 22:
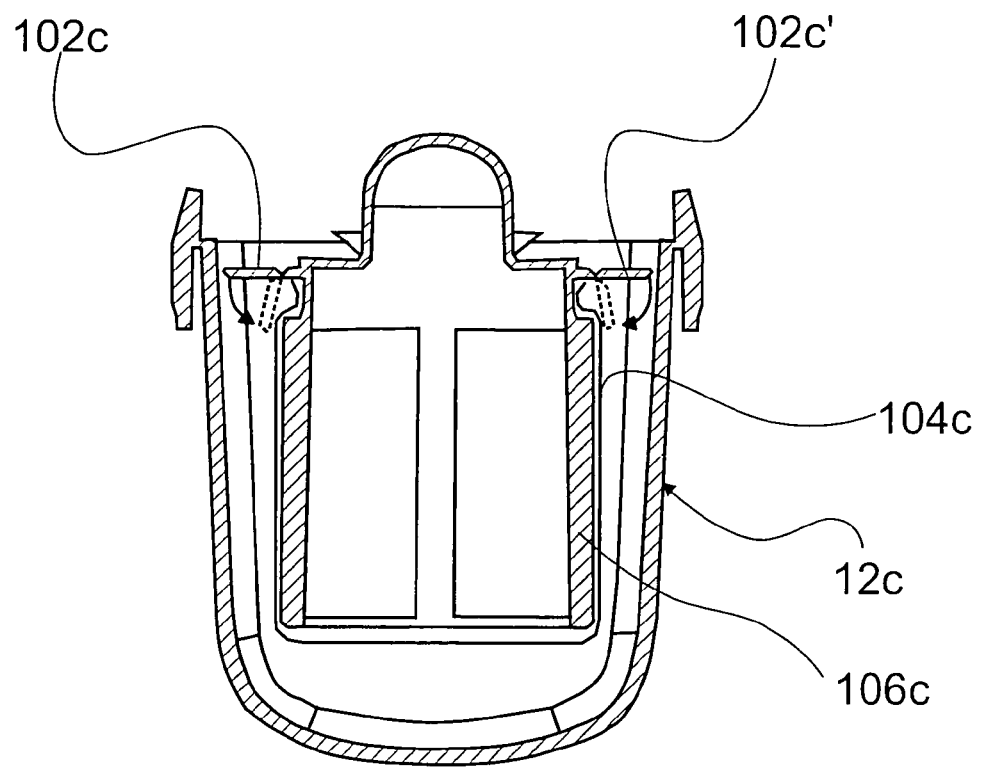
FIG. 22 shows a dust container of the suction head in FIG. 20 and FIG. 21 in a sectional view along a line XXII-XXII.

A further alternative suction device includes a handle 62c installed on a ring for mounting the suction device on a not-shown power tool in a manner that is variable relative to an angle around working direction 24c, on which said ring a bearing unit configured as a guide rod 46c is also mounted (FIGS. 18 and 19). Furthermore, the ring includes a receptacle (not shown here) for a conventional depth stop configured as a separate rod. A dust container 12c is rotatably supported in a retention region 100c of suction head 14c, by way of which dust container 12c is rotatable around a drilling axis relative to handle 62c when the suction device is in the installed state, and by way of which it is possible to fit the suction device in tight-spaced drilling situations (FIG. 20). Furthermore, dust container 12c is detachable from retention region 100c and includes flaps 102c, 102c' configured as a single component with a body of dust container 12c that, when dust container 12c is detached from retention region 100c, automatically close dust container 12c (FIG. 22). A dust sack 104c is installed in an interior space of dust container 12c and is kept open by a support device 106c.

Figure 23:
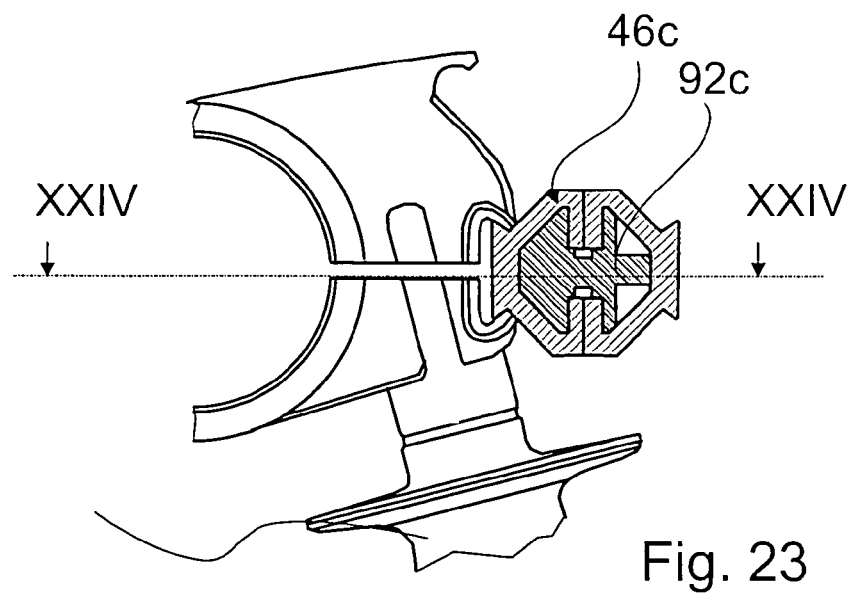
FIG. 23 shows a profile of a guide rod and a section of the handle of the suction device in FIGS. 20 through 23.
Figure 24:
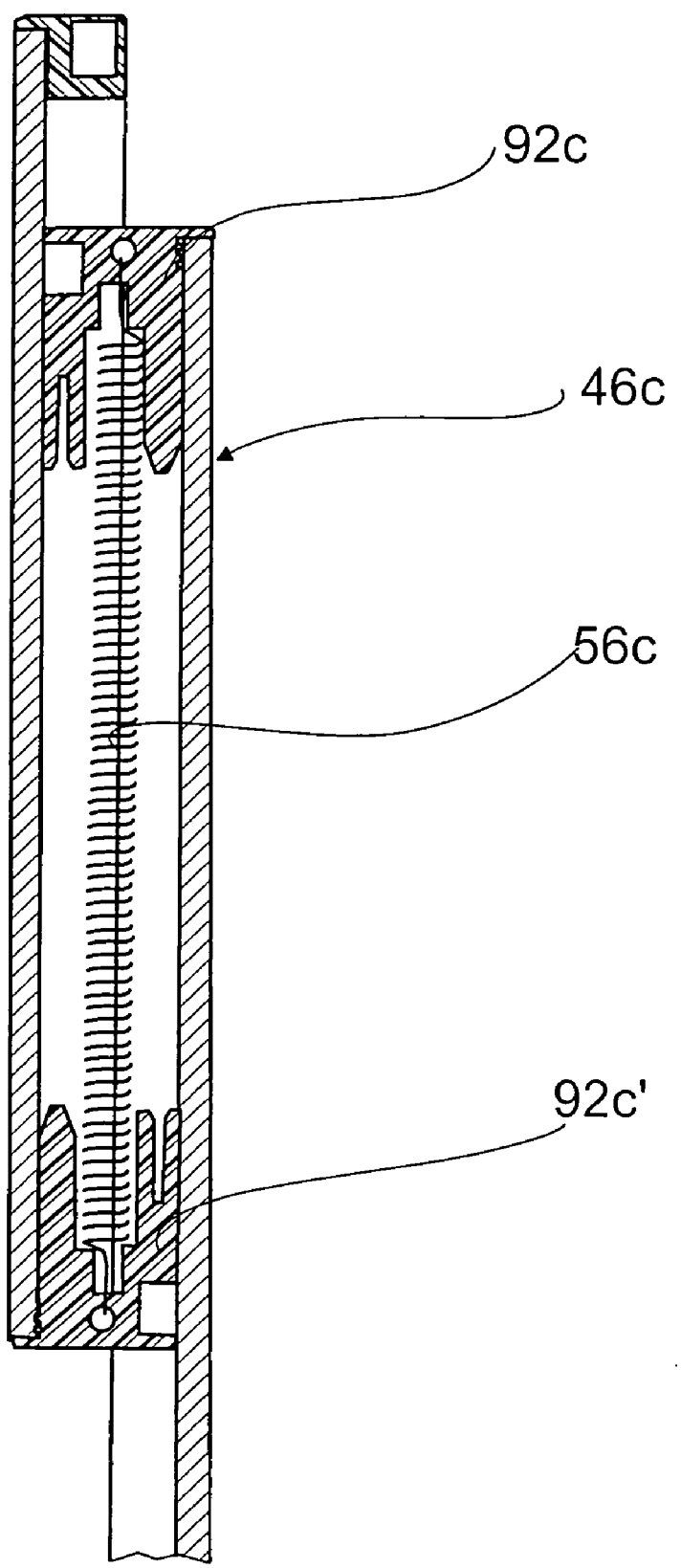
FIG. 24 shows the guide rod in FIG. 23.

Guide rod 46c includes two elements with substantially C-shaped profiles (FIG. 23) which, together, form an interior space in which a coil tension spring 56c is located. On their ends, guide elements 92c, 92c' are pressed into the elements of guide rod 46c, in which said guide elements coil tension spring 56c engages and on which damping regions acting as spacers are provided that prevent coil tension spring 56c from becoming fully compressed.

REFERENCE NUMERALS

| | |
|---|---|
| 10 | Power tool |
| 12 | Dust container |
| 14 | Suction head |
| 16 | Work piece |
| 18 | Device |
| 20 | Cooling fan |
| 22 | Unit |
| 24 | Working direction |
| 26 | Housing |
| 28 | Depth stop |
| 30 | Opening |
| 32 | Tool |
| 34 | Suction part |
| 36 | Drive motor |
| 38 | Shaft |
| 40 | Impeller |
| 42 | Suction duct |
| 44 | Filter |
| 46 | Guide rod |
| 48 | Guide rod |
| 50 | Retention part |

-continued

| | |
|---|---|
| 52 | Cover |
| 54 | Toothed profile |
| 56 | Coil tension spring |
| 58 | Valve |
| 60 | Suction duct |
| 62 | Handle |
| 64 | Drill chuck |
| 66 | Snap-in connection |
| 68 | Snap-in connection |
| 70 | Plexiglass disk |
| 72 | Unit |
| 74 | Lever |
| 76 | Insert |
| 78 | Wedge |
| 80 | Two-leg spring |
| 82 | Duct section |
| 84 | Guide element |
| 86 | Drive element |
| 88 | Cover plate |
| 90 | Screw |
| 92 | Guide element |
| 94 | Leg |
| 96 | Lever |
| 98 | Pressure |
| 100 | Retention region |
| 102 | Flap |
| 104 | Dust sack |
| 106 | Support device |

What is claimed is:

1. A suction device for a power tool (10a, 10b) comprising a dust container (12a-12c); a suction head (14a-14c) to be placed on a work piece (16a-16b), wherein the dust container (12a-12c) is integrated in the suction head (14a-14c); a bearing unit (46a-46c, 48a) by which the suction head (14a-14c) with the integrated dust container (12a-12c) is supportable on a housing (26a-26b) of the power tool (10a, 10b) such that when the bearing unit is fixedly supported on the housing, the suction head (14a-14c) with the integrated dust container (12a-12c) is displaceable relative to the housing along a working direction (24a-24c) of the power tool, and also including a suction duct which directs air flow from the suction head into the housing, and wherein the suction head (14a-14c) includes an opening through which a tool bit (32a, 32b) drivable by the power tool is capable of being guided in at least one operating state of the power tool.

2. The suction device as recited in claim 1, characterized by a suction unit (18a-18b) integrated in the power tool (10a, 10b) for producing a vacuum in the suction head (14a-14c).

3. The suction device as recited in claim 2, wherein the suction device (18a 18b) includes a cooling fan (20a, 20b) of the power tool (10a, 10b).

4. The suction device as recited in claim 1, characterized by an additional unit (22a-22c) that includes the bearing unit (46a-46c, 48a) for supporting the suction head (14a-14c) on a housing (26a, 26b) of the power tool (10a, 10b) and is capable of being detachably retained on the power tool (10a, 10b).

5. The suction device as recited in claim 4, wherein the additional unit (22a-22c) is retainable on the power tool (10a, 10b) using a snap-in connection.

6. A suction device as recited in claim 4, wherein a filter (44a) is mounted on said bearing unit (46a, 48a).

7. A suction device as defined in claim 4, wherein the bearing unit is formed by guide rods (46a-46c, 48a).

8. The suction device as recited in claim 1, wherein the bearing unit (46a-46c, 48a) includes a depth stop.

9. The suction device as recited in claim 1, wherein various dimensions can be selected for the opening (30a'-30c') by selecting from replaceable portions of the suction head that have different dimensions.

10. The suction device as recited in claim 1, wherein the opening (30a-30c) forms one end of a funnel-shaped receiving area that tapers in the working direction (24a-24c).

11. The suction device as recited in claim 1, wherein an air stream is capable of being introduced into the dust container (12a) through a duct section (82a) of the suction head (14a) in a circumferential direction of the dust container (12a).

12. A suction device as recited in claim 1, wherein the suction head (14a-14c) has a suction part (34a-34c) which forms a single unit (72a-72c) with the dust container (12a-12c).

13. A suction device as recited in claim 12, further comprising a second unit (22a-22c), wherein said single unit (72a-72c) is detachably retained on said second unit (22a-22c).

14. The suction device as recited in claim 13, wherein said second unit (22a, 22c) is capable of being detachably retained on the power tool (10a, 10b).

15. A suction device as recited in claim 13, wherein said single unit (72a-72c) can be fixed by a snap-in connection (68a) at a side of said second unit (22a-22c) facing the work place.

16. A suction device as recited in claim 12, wherein air and removed material which are suctioned up through openings (30a, 30a-30c) in the suction part (34a-34c) are introduced perpendicularly to the working direction (24a) via a duct section (82a) into the dust container (12a-12c).

17. A suction device as recited in claim 1, wherein the suction head (14a-14c) has a suction part (34a-34c) which forms with the dust container (12a-12c) a one-piece unit.

18. A suction device as recited in claim 1; further comprising connecting means for removably connecting the suction head with the integrated dust container to the bearing unit.

19. A suction device as defined in claim 18, wherein said connecting means comprise a lever with a hook.

20. A suction device as defined in claim 1, and further comprising connecting means for removably connection the suction head with the integrated dust container to the suction duct.

* * * * *